United States Patent
French, Jr.

(10) Patent No.: US 9,961,831 B1
(45) Date of Patent: May 8, 2018

(54) CONTROLLING A MOBILE MACHINE BASED ON SENSED VARIABLES FILTERED WITH DIFFERENT FILTERS

(71) Applicant: Deere & Company, Moline, IL (US)

(72) Inventor: William D. French, Jr., Bettendorf, IA (US)

(73) Assignee: Deere & Company, Moline, IL (US)

( * ) Notice: Subject to any disclaimer, the term of this patent is extended or adjusted under 35 U.S.C. 154(b) by 4 days.

(21) Appl. No.: 15/338,711

(22) Filed: Oct. 31, 2016

(51) Int. Cl.
*A01D 41/127* (2006.01)
*E02F 9/26* (2006.01)

(52) U.S. Cl.
CPC ....... *A01D 41/127* (2013.01); *A01D 41/1271* (2013.01); *E02F 9/265* (2013.01)

(58) Field of Classification Search
CPC .. A01D 41/127; A01D 41/12; A01D 41/1271; A01D 41/1272; A01D 41/1273; E02F 9/265
USPC ......................................... 56/10.2 R; 701/50
See application file for complete search history.

(56) References Cited

U.S. PATENT DOCUMENTS

| | | | |
|---|---|---|---|
| 5,600,941 A | 2/1997 | Stosser | |
| 6,282,476 B1 | 8/2001 | Hieronymus | |
| 2008/0231853 A1* | 9/2008 | Berzaghi | G01N 21/276 356/326 |
| 2014/0277961 A1 | 9/2014 | Blank | |
| 2015/0146547 A1 | 5/2015 | Kapnadak et al. | |
| 2015/0348419 A1* | 12/2015 | Matthews | A01B 79/02 701/117 |
| 2016/0247082 A1* | 8/2016 | Stehling | G06Q 10/04 |
| 2017/0086373 A1* | 3/2017 | Mahieu | A01D 41/127 |
| 2017/0196171 A1* | 7/2017 | Xu | A01G 1/001 |
| 2017/0202143 A1* | 7/2017 | Garton | A01D 41/1271 |
| 2017/0235471 A1* | 8/2017 | Scholer | G06F 3/04847 715/772 |
| 2017/0265390 A1* | 9/2017 | Panoushek | A01D 41/1243 |

FOREIGN PATENT DOCUMENTS

| | | | | |
|---|---|---|---|---|
| EP | 0347979 A1 | 12/1989 | | |
| EP | 0375301 A1 | 6/1990 | | |
| EP | 3135101 A1 * | 3/2017 | ............... | A01F 7/06 |

OTHER PUBLICATIONS

Application No. EP17196319 Extended European Search Report dated Mar. 1, 2018, 8 pages.

* cited by examiner

Primary Examiner — John Weiss
(74) Attorney, Agent, or Firm — Joseph R. Kelly; Kelly, Holt & Christenson PLLC

(57) ABSTRACT

A sensor generates a sensor signal indicative of a sensed variable. A first filter is applied to the sensor signal, and filters the sensor signal based on a first set of sensor data, to generate a first filtered signal. A second filter is applied to the sensor signal, based on a second set of sensor data that is greater than the first set of sensor data, to generate a second filtered sensor signal. The first and second filtered sensor signals are compared to generate a control signal that can be used to control a controllable subsystem of a mobile machine.

20 Claims, 8 Drawing Sheets

US 9,961,831 B1

CONTROLLING A MOBILE MACHINE BASED ON SENSED VARIABLES FILTERED WITH DIFFERENT FILTERS

FIELD OF THE DESCRIPTION

The present description relates to controlling the operation of an agricultural machine. More specifically, the present description relates to controlling the operation of an agricultural machine by sensing an operational variable and filtering the corresponding sensor signal with multiple filters.

BACKGROUND

There are a wide variety of different types of agricultural machines. Some such machines have control systems that control certain aspects of the operation of the machine, based on sensor signals that sense variables.

By way of example, a harvesting machine, such as a combine, can have many different operator controllable settings. The value for each of those settings may vary based on a wide variety of different types of criteria. For instance, the optimum settings on a combine may vary based upon crop type, machine type or configuration, weather conditions, soil conditions, the characteristics of the crop, the topology of the field, etc. The settings on the combine can include a wide variety of settings, such as multiple threshing and cleaning settings, among others.

The performance achieved by the combine can be described or characterized by multiple different parameters. Some systems attempt to sense or otherwise capture performance characteristics to describe machine performance, and use those values to determine when to adjust the machine settings.

Some sensors can be used to sense the performance characteristics. For instance, grain loss sensors can be configured to sense grain loss during the harvesting operation. Other sensors can be configured to sense grain quality (such as whether the grain is damaged or unthreshed or whether the harvested grain includes other materials, other than the grain itself).

The discussion above is merely provided for general background information and is not intended to be used as an aid in determining the scope of the claimed subject matter.

SUMMARY

A sensor generates a sensor signal indicative of a sensed variable. A first filter is applied to the sensor signal, and filters the sensor signal based on a first set of sensor data, to generate a first filtered signal. A second filter is applied to the sensor signal, based on a second set of sensor data that is greater than the first set of sensor data, to generate a second filtered signal. The first and second filtered signals are compared to generate a control signal that can be used to control a controllable subsystem of a mobile machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
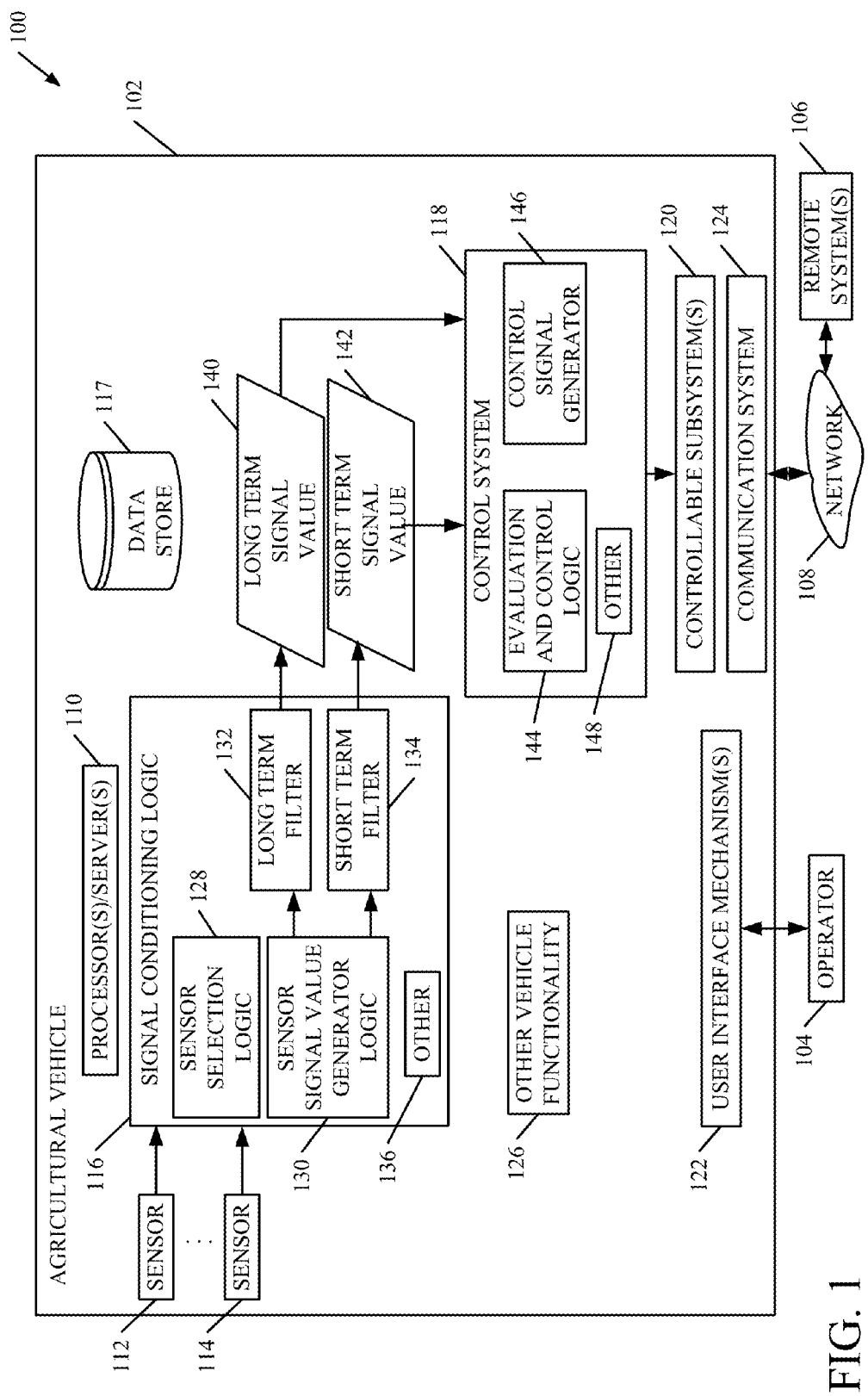
FIG. 1 is a block diagram of one example of an agricultural vehicle architecture.

FIG. 1 is a block diagram of one example of a mobile machine (or agricultural vehicle) architecture 100. Architecture 100 illustratively includes agricultural vehicle 102 that can be controlled by an operator 104. Agricultural vehicle 102, in one example, can also communicate with one or more remote systems 106 over a network 108 or other communication mechanism.

Agricultural vehicle 102 illustratively includes one or more processors or servers 110, a set of sensors including sensors 112-114, signal conditioning logic 116, data store 117, control system 118, one or more controllable subsystems 120, user interface mechanisms 122, and it can include a communication system 124 as well. Agricultural vehicle 102 can also illustratively include a wide variety of other vehicle functionality 126.

Before describing the operation of architecture 100 in more detail, a brief description of some of the items in architecture 100, and their operation will first be provided. In the example illustrated in FIG. 1, signal conditioning logic 116 illustratively includes sensor selection logic 128, sensor signal value generator logic 130, long-term filter 132, short-term filter 134, and it can include other items 136. Each sensor 112-114 illustratively generates a sensor signal and provides it to signal conditioning logic 116. Sensors 112-114, as is described in greater detail below, can sense any of a wide variety of different types of sensed variables either on agricultural vehicle 102, or in the environment around agricultural vehicle 102, or elsewhere. Sensor selection logic 128 selects one or more of the sensor signals to be processed. A selected sensor signal is provided to sensor signal value generator logic 130 which generates sensor signal values based upon the sensor signal received.

In one example, the sensor signal provided by a selected sensor may vary widely for a variety of different reasons. The sensed variable may actually change rapidly or the signal may be noisy, etc. This can make controlling the subsystem to a setpoint, based on a given sensor signal, very difficult. The present system thus applies two or more filters, that consider sensor signal values, for a given sensor, over different time intervals, to control a subsystem.

In one example, long-term filter 132 generates a long-term signal value 140 that is indicative of a first plurality of sensor signal values generated by sensor signal value generator logic 130. Short-term, filter 134 generates short-term signal value 142. Short-term signal value 142 is illustratively generated by short-term filter 134 using a second plurality of sensor signal values generated by sensor signal value generator logic 130, where the second plurality is less than the first plurality. Therefore, long-term filter 132 provides long-term signal value 140, which is representative of the value of the sensor signal being processed, over a relatively long term, and is based on a relatively large number of sensor signal values over that long term. In contrast, short-term filter 134 generates short-term signal value 142 which is representative of the sensor signal values over a relatively short term, and is based on a set of relatively recent sensor signal values (which are fewer than the long term signal values) over a relatively short and recent term. Thus, the long-term signal value 140 will illustratively reflect changes in the sensor signal values more slowly (because it is based on a relatively large number of sensor signal values generated over a longer period of time) than the short-term signal value 142, which reflects value changes more quickly (because it is based on fewer, more recent, sensor signal values).

The filters can be relatively simple filters, to relatively complex filters. For instance, the short-term filter output may be indicative of a rolling average of the ten most recent sensor signal values generated by sensor signal value generator logic 130. The long-term signal value 140 may be indicative of a rolling average of the last 100 signal values. Of course, these are examples only. Control system 118 illustratively receives the long-term signal value 140 and the short-term signal value 142 and generates a control signal, based upon those two values 140 and 142, to control one or more controllable subsystems 120. Control system 118 illustratively includes evaluation and control logic 144, control signal generator 146, and it can include other items 148. Evaluation and control logic 144 illustratively evaluates the two signal values 140 and 142 to determine whether any control adjustments (and if so, which ones) should be made to the controllable subsystems 120. Based on that determination, control signal generator 146 generates an appropriate control signal to modify control of the one or more controllable subsystems 120.

User interface mechanisms 122 can illustratively include one or more display devices, audio devices for providing audio interfaces, haptic devices that provide haptic feedback, levers, joysticks, steering wheels, pedals, buttons, etc. User interface mechanisms 122 can also be a set of input mechanisms displayed on a user interface display. For instance, they can be links, icons, or other user actuatable mechanisms. In addition, where agricultural vehicle 102 has speech recognition components, user interface mechanisms 122 can include a microphone or other mechanism for receiving speech commands from operator 104. Operator 104 can illustratively interact with one or more of the user interface mechanisms 122 in order to control and manipulate agricultural vehicle 102.

Communication system 124 can include any of a wide variety of different types of communication systems that can communicate using a wired or wireless link with other components. In addition, network 108 can be a wide variety of different networks that can be used by communication system 124 to communicate with remote systems 106 or with other systems. Communication system 124 can, for instance, be a cellular communication system, a system that can communicate over a wide area network, a local area network, a near field communication link, or any of a variety of other wired or wireless links.

Remote systems 106 can be remote websites, manufacturer or vendor computing systems, farm manager computing systems, or any of a wide variety of remote systems. Those listed are listed by way of example only.

Figure 2:
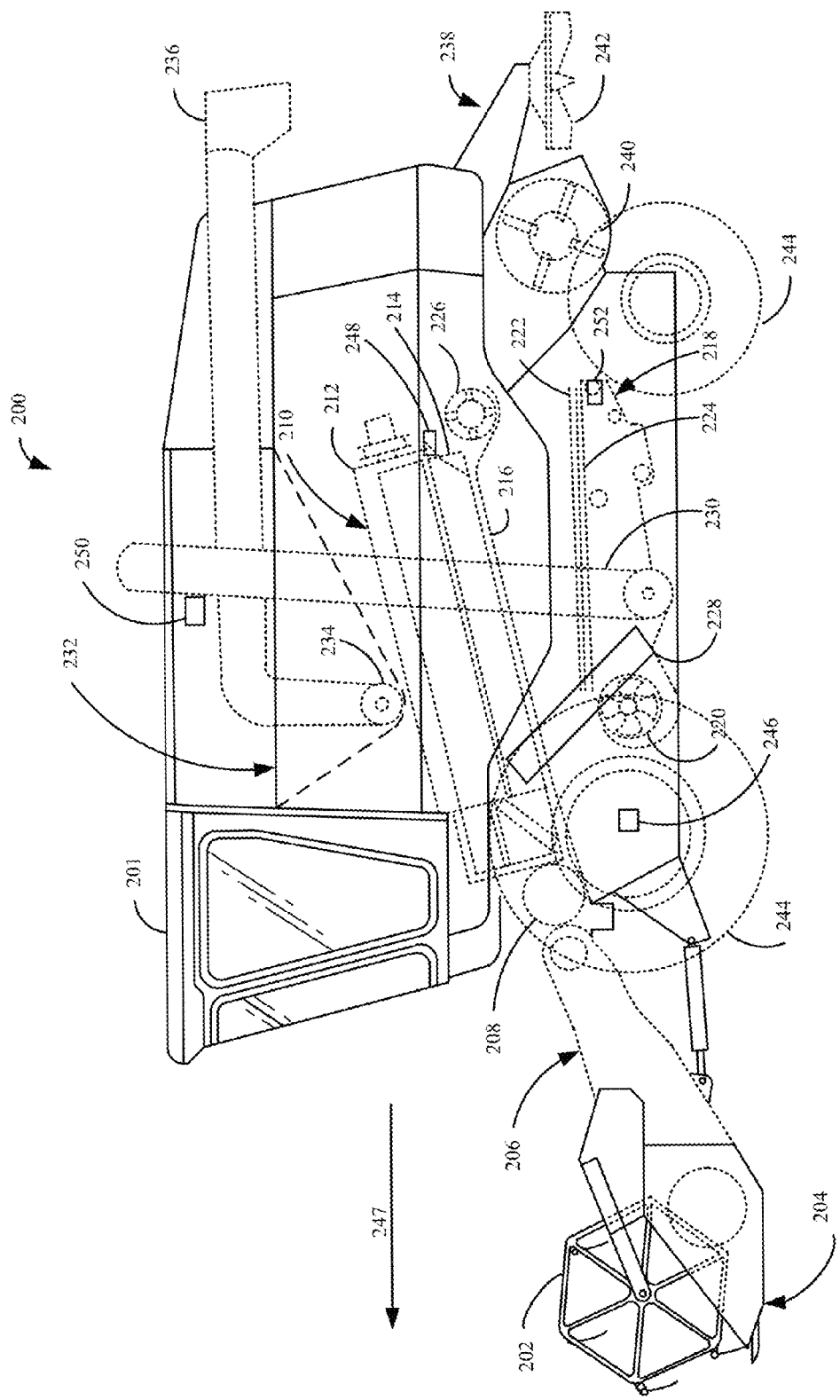
FIG. 2 is a partial pictorial, partial schematic view of one example of a combine harvester.

FIG. 2 is a partial pictorial, partial schematic illustration of an agricultural vehicle which comprises a combine harvester 200. For example, combine harvester 200 can operate as agricultural vehicle 102 shown in FIG. 1. It can be seen in FIG. 2 that combine harvester 200 illustratively includes an operator compartment 201, and a set of front end equipment that can include header 202, and a cutter generally indicated at 204. It can also include a feeder house 206, a feed accelerator 208, and a thresher generally indicated at 210. Thresher 210 illustratively includes a threshing rotor 212 and a set of concaves 214. Further, combine 200 can include a separator 216 that includes a separator rotor. Combine 200 can include a cleaning subsystem (or cleaning shoe) 218 that, itself, can include a cleaning fan 220, chaffer 222 and sieve 224. The material handling subsystem in combine 200 can include (in addition to a feeder house 206 and feed accelerator 208) discharge beater 226, tailings elevator 228, clean grain elevator 230 (that moves clean grain into clean grain tank 232) as well as unloading auger 234 and spout 236. Combine 200 can further include a residue handling subsystem 238 that can include residue chopper 240 and spreader 242. Combine 200 can also have a propulsion subsystem that includes an engine that drives ground engaging wheels 244 or tracks, etc. It will be noted that combine 200 may also have more than one of any of the subsystems mentioned above (such as left and right cleaning shoes, separators, etc.).

In operation, and by way of overview, combine 200 illustratively moves through a field in the direction indicated by arrow 247. As it moves, header 202 engages the crop to be harvested and gathers it toward cutter 204. After it is cut, it is moved through a conveyor in feeder house 206 toward feed accelerator 208, which accelerates the crop into thresher 210. The crop is threshed by threshing rotor 212 rotating the crop against concave 214. The threshed crop is moved by a separator rotor in separator 216 where some of the residue is moved by discharge beater 226 toward the residue handling subsystem 238. It can be chopped by residue chopper 240 and spread on the field by spreader 242. In other implementations, the residue is simply dropped in a windrow, instead of being chopped and spread.

Grain falls to cleaning shoe (or cleaning subsystem) 218. Chaffer 222 separates some of the larger material from the grain, and sieve 224 separates some of the finer material from the clean grain. Clean grain falls to an auger in clean grain elevator 230, which moves the clean grain upward and deposits it in clean grain tank 232. Residue can be removed from the cleaning shoe 218 by airflow generated by cleaning fan 220. That residue can also be moved rearwardly in combine 200 toward the residue handling subsystem 238.

Tailings can be moved by tailings elevator 228 back to thresher 210 where they can be re-threshed. Alternatively, the tailings can also be passed to a separate re-threshing mechanism (also using a tailings elevator 228 or another transport mechanism) where they can be re-threshed as well.

FIG. 2 also shows that, in one example, combine 200 can include ground speed sensor 246, one or more separator loss sensors 248, a clean grain camera 250, and one or more cleaning shoe loss sensors 252. Ground speed sensor 246 illustratively senses the travel speed of combine 200 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 252 illustratively provide an output signal indicative of the quantity of grain loss by both the right and left sides of the cleaning shoe 218. In one example, cleaning shoe loss sensors 252 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that cleaning shoe loss sensors 252 can comprise only a single sensor as well, instead of separate sensors for each shoe.

Separator loss sensor 248 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 248 may also comprise only a single sensor, instead of separate left and right sensors.

It will also be appreciated that sensors 112-114 in FIG. 1 (in addition to the sensors already described) can include other sensors on combine 200 as well. For instance, they can include a machine state sensor that is configured to sense whether machine 200 is configured to chop the residue, drop a windrow, etc. They can include cleaning shoe fan speed sensors that can be configured proximate cleaning fan 220 to sense the speed of cleaning fan 220. They can include a material other than grain (MOG) sensor(s) that can be configured to sense large and small materials, other than grain, that are entering clean grain tank 232, or are otherwise passing through machine 200. They can also include sensors that sense the quality of grain entering clean grain tank 232 (such as whether it is whole, cracked, unthreshed, etc.). This can be done, for instance, by performing image analysis on the images captured by camera 250 or in other ways. They can include sensors or sensor combinations that indicate a constituent percent of clean grain entering clean grain tank 232. They can include machine setting sensors that are configured to sense the various configurable settings on machine 200. They can also include a machine orientation sensor that can be any of a wide variety of different types of sensors that sense the orientation of machine 200. Crop property sensors can sense a variety of different types of crop properties, such as crop type, crop moisture, and other crop properties. They can also be configured to sense characteristics of the crop as they are being processed by machine 200. For instance, they can sense grain feed rate, as it travels through clean grain elevator 230. They can sense mass flow rate through elevator 230, or provide other output signals indicative of similar variables and they may be indicative of yield. It will also be noted that the various sensors can be mechanisms that directly measure the sensed variables, or they can be components that generate an estimation of the sensed variables from other sensor inputs. For instance, a yield sensor may sense mass flow rate of product through the clean grain elevator 230, and generate a metric indicative of yield, based upon that sensor input. This is but one example, and the sensors can take a wide variety of different forms as well.

Figure 3:
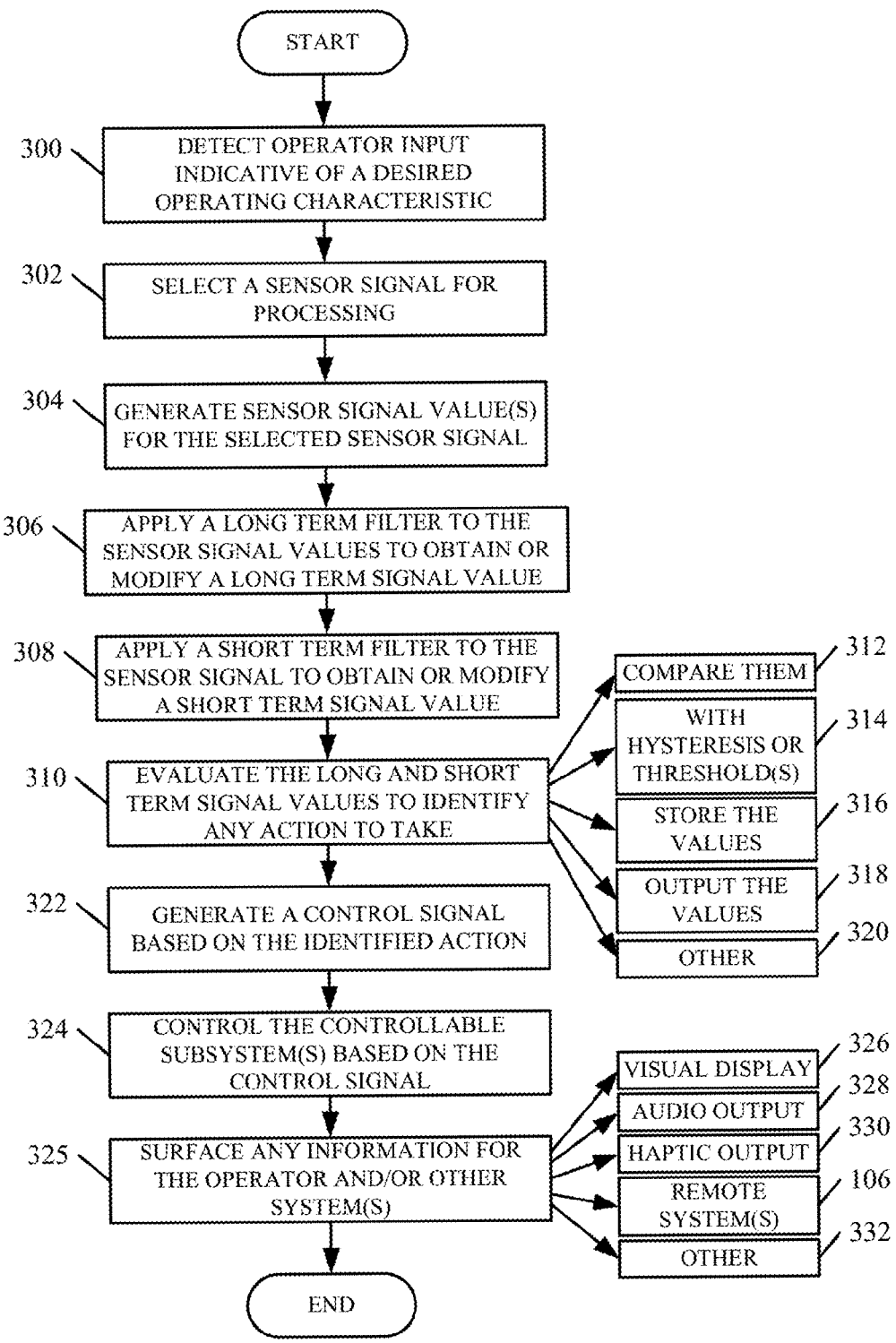
FIG. 3 is a flow diagram illustrating one example of the operation of the agricultural vehicle illustrated in FIG. 1, in applying multiple filters to a sensor signal, in order to control a controllable subsystem.

Also, in accordance with one example, controllable subsystems 120 from FIG. 1 can include the rotor speed, fan speeds, concave settings (e.g., the spacing between concave 214 and threshing rotor 212), chaffer settings (e.g., the settings that determine how far open or closed chaffer 222 is, the settings for sieve 224, and ground speed of agricultural vehicle 102) or other systems on combine harvester 200. These are examples only. FIG. 3 is a flow diagram illustrating one example of the operation of architecture 100, shown in FIG. 1. At certain points, it will be described with respect to agricultural vehicle 102 being a combine harvester 200. It will be appreciated, however, that the description can apply to other agricultural vehicles, and mobile machines, as well.

For the purposes of the present description, it will be assumed that one of sensors 112-114 (e.g., sensor 112) senses a variable indicative of a constituent percentage of clean grain entering a clean grain tank 232 on a combine harvester. For instance, the signal may be any one or a combination of signals indicative of different types or percentages of material other than grain (such as light or heavy materials other than grain) that are entering the clean grain tank along with the grain. They could be signals indicative of grain quality, such as whether the grain entering the clean grain tank is broken or unthreshed. These are examples only, and the sensor signals could be indicative of grain loss, such as grain loss in the separator or grain loss in the cleaning shoe 218, or other signals.

With respect to FIG. 3, it is first assumed that the operator provides an input indicating that the sensed variable is adequate, given the operator's observation. For instance, it may be that the operator is viewing the grain entering the clean grain tank 232, and is able to observe that the grain is relatively clean and unbroken. In that case, the operator may provide an input signal indicating that the grain quality or cleanliness of the grain entering the clean grain tank is adequate and thus, combine harvester 200 should be controlled to maintain that parameter, at the present level. It will be appreciated that the same technique can be used with respect to other parameters, such as yield, grain loss, etc. Detecting an operator input indicative of a desired operating characteristic is indicated by block 300 in the flow diagram of FIG. 3.

Sensor selection logic 128 then selects a sensor signal for processing. This is indicated by block 302. It will be appreciated that multiple sensor signals can be selected for substantially simultaneous processing, or a single sensor signal can be selected for processing. For purposes of the present discussion, it will be assumed that the sensor signal generated by sensor 112 represents a constituent percentage of clean grain entering the clean grain tank. It will also be assumed that that sensor signal has been selected for processing by signal conditioning logic 116.

Sensor signal value generator logic 130 then generates one or more sensor signal values for the selected sensor signal. This is indicated by block 304. For instance, sensor signal value generator logic 130 may digitize the sensor signal to generate a sensor signal value. It may perform other conditioning operations as well, such as performing amplification, filtering out high or low frequency transients, linearization, normalization, etc.

Long-term filter 132 is then applied to the sensor signal values generated by sensor signal value generator logic 130 to obtain or modify a long-term signal value 140 for this particular sensor. This is indicated by block 306. It will be appreciated that where a long-term signal value has not yet been generated, then long-term filter 132 will generate the long-term signal value 140. However, where one has already been generated, then the long-term signal value 140 will be generated based upon a more recent set of sensor signal values that have been received since the last long-term signal value 140 was generated for this sensor.

Signal conditioning logic 116 also applies short-term filter 134 to the sensor signal values generated by sensor signal value generator logic 130 in order to obtain or modify a short-term signal value 142 for the selected sensor. This is indicated by block 308. In one example, the number of sensor signal values considered by long-term filter 132 in generating a representative long-term signal value 140 is higher than the number of signal values used by short-term filter 134 to generate the representative short-term signal value 142.

By way of example only, it may be that short-term filter 134 uses the most recent 150 sensor signal values to generate the short-term signal value 142. By contrast, it may be that long-term filter 132 uses the most recent 900 sensor signal values for this sensor in order to generate the long-term signal value 140. In addition, it may be that the particular sensor signal values used to generate the long and short term signal values 140 and 142, respectively, may be weighted differently. For instance, it may be that the more recent sensor signal values are weighted higher in generating the long and short-term signal values, while those taken in the more distant past are weighted lower. They may be weighted differently in generating the long-term signal value 140 than they are in generating the short-term signal value 142, or they may be weighted the same.

In addition, it may be that there are more filters than just the long-term filter 132 and short-term filter 134 shown in FIG. 1. Instead, there may be an intermediate filter that generates an intermediate signal value. There may be more than one intermediate filter that generate more than one intermediate signal values. All of these architectures are contemplated herein.

The signal values 140 and 142 are then provided to control system 118. Evaluation and control logic 144 then evaluates the long and short-term signal values relative to one another to identify any action that should be taken with respect to the controllable subsystems 120. This is indicated by block 310 in the flow diagram of FIG. 3.

In one example, evaluation and control logic 144 compares the two signal values 140 and 142, as indicated by block 312, and determines whether to take action based on that comparison. In addition, the comparison may indicate how much the two signals deviate from one another, and in which direction. That value can be evaluated with respect to a particular hysteresis or deviation threshold to determine whether to take action. This is indicated by block 314. The signal values can be stored, such as in data store 117 or elsewhere, for use in later updating or other processing. The values can also be output to remote systems 106, or in other ways, as indicated by blocks 318 and 320.

In one example, the individual sensor signal values may vary widely from one another, even over a relatively short period of time. Therefore, the signals may be normalized separately or normalized relative to one another. The normalization can take place before the long-term signal value 140 and short-term signal value 142 are generated, or it can take place after they are compared with one another. By way of example, the signals can be compared with one another and the difference can be compared to previous differences from the same comparison at previous time intervals. The action determination can be made based on how much the difference varies from the previous differences, or in a wide variety of other ways.

Control signal generator 146 then generates a control signal to control one or more of the controllable subsystems 120, based upon the identified action. This is indicated by block 322. By way of example, assuming that the selected sensor signal is indicative of the cleanliness of grain entering the clean grain tank, if the grain is extremely clean, this may indicate that there is excessive grain loss. Therefore, a control signal may be generated to modify the settings of chaffer 222, sieve 224 or cleaning fan 220, in one direction. On the other hand, if the sensor signal indicates that the grain cleanliness is insufficient, this may indicate excessive material other than grain is entering the clean grain tank. The control signal may thus be generated to modify one or more of the chaffer, sieve and cleaning fan settings in the other direction. Of course, these are examples only and a wide variety of other controllable subsystems can be controlled based on a wide variety of identified actions and corresponding control signals.

Once the control signal generator 146 generates the control signal, it is applied to the controllable subsystems 120 that are to be controlled in order to accomplish the identified action. This is indicated by block 324. User interface mechanisms 122 can then be used to surface any information for the operator and/or other systems (such as remote systems 106). This is indicated by block 325. For example, some indication that the identified action is being taken and that the corresponding control signal is being generated may be displayed for operator 104 on a visual display 326. It can be provided using an audio output mechanism 328 or a haptic mechanism 330. The information can be sent to remote systems 106, or it can be surfaced in a wide variety of other ways 332. Also, the operation may be surfaced for user authorization. For instance, an indication of a suggested action may be surfaced for the operator 104 along with a user actuable mechanism (such as an icon) that can be actuated by the user. Once actuated, the system automatically controls the controllable subsystem(s) to take the suggested action.

It can thus be seen that the present system applies two or more filters to a sensor signal or a set of sensor signals and compares the difference between the filter outputs. One of the filters considers a larger number of data points or signal values than the other filter. The difference between the two filter outputs is then used to influence a control point to which one or more controllable subsystems 120 is controlled. The system is thus much less susceptible to variations due to noisy signal fluctuations or even to accurate sensor outputs where the sensed variable varies widely, and relatively quickly. The system allows an operator, e.g. operator 104, to provide an input signal indicating when operating conditions are acceptable. The long-term filter output can then be used as the set point and the short-term filter output can be compared to that set point to determine what actions are to be taken in order to maintain the short-term signal output so that it is relatively close to the set point indicated by the long-term filter output.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information on map 107 can be output to the cloud.

Figure 4:
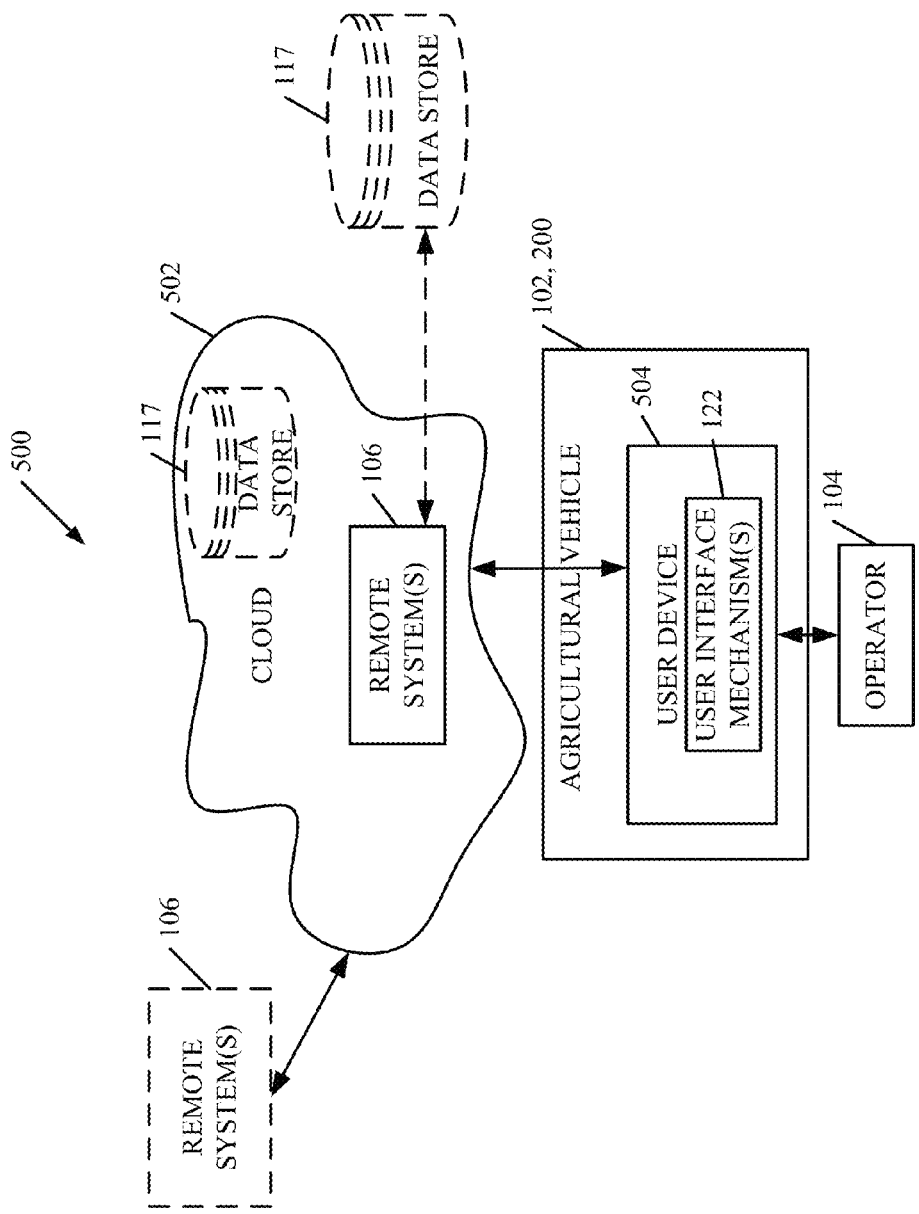
FIG. 4 is a block diagram of one example of the architecture illustrated in FIG. 1, deployed in a remote server architecture.

FIG. 4 is a block diagram of architecture 100, shown in FIG. 1, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 4, some items are similar to those shown in FIG. 1 and they are similarly numbered. FIG. 4 specifically shows remote systems 106 and data store 117 can be located at a remote server location 502. Therefore, agricultural vehicle 102 can access those systems through remote server location 502.

FIG. 4 also depicts another example of a remote server architecture. FIG. 4 shows that it is also contemplated that some elements of FIG. 1 can be disposed at remote server location 502 while others are not. By way of example, data store 117 or remote system(s) 106 can be disposed at a location separate from remote server location 502, and accessed through the remote server at remote server location 502. Regardless of where they are located, they can be accessed directly by agricultural vehicle 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
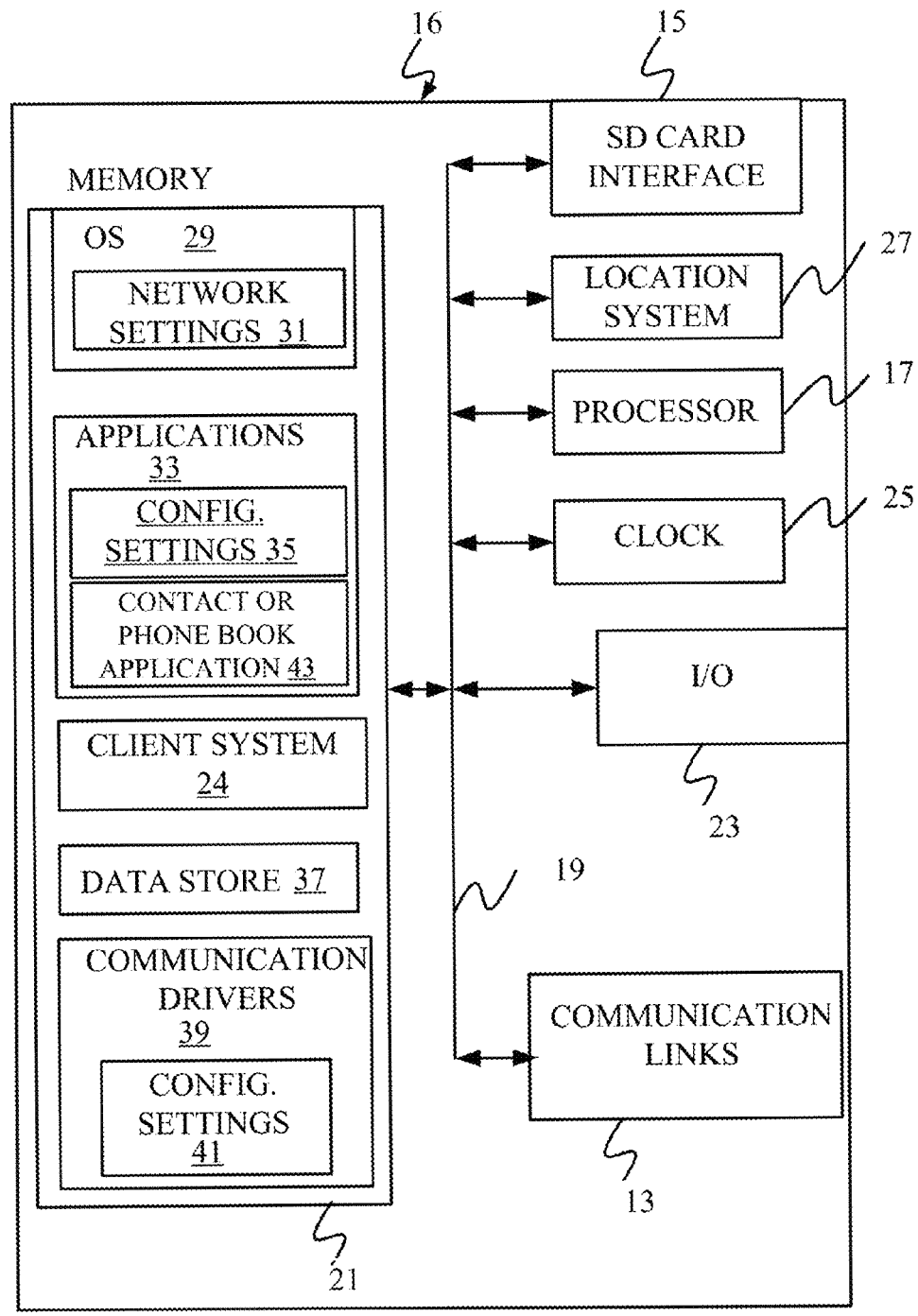
FIGS. 5-7 show examples of mobile devices that can be used in the architectures shown in the previous figures.
Figure 6:
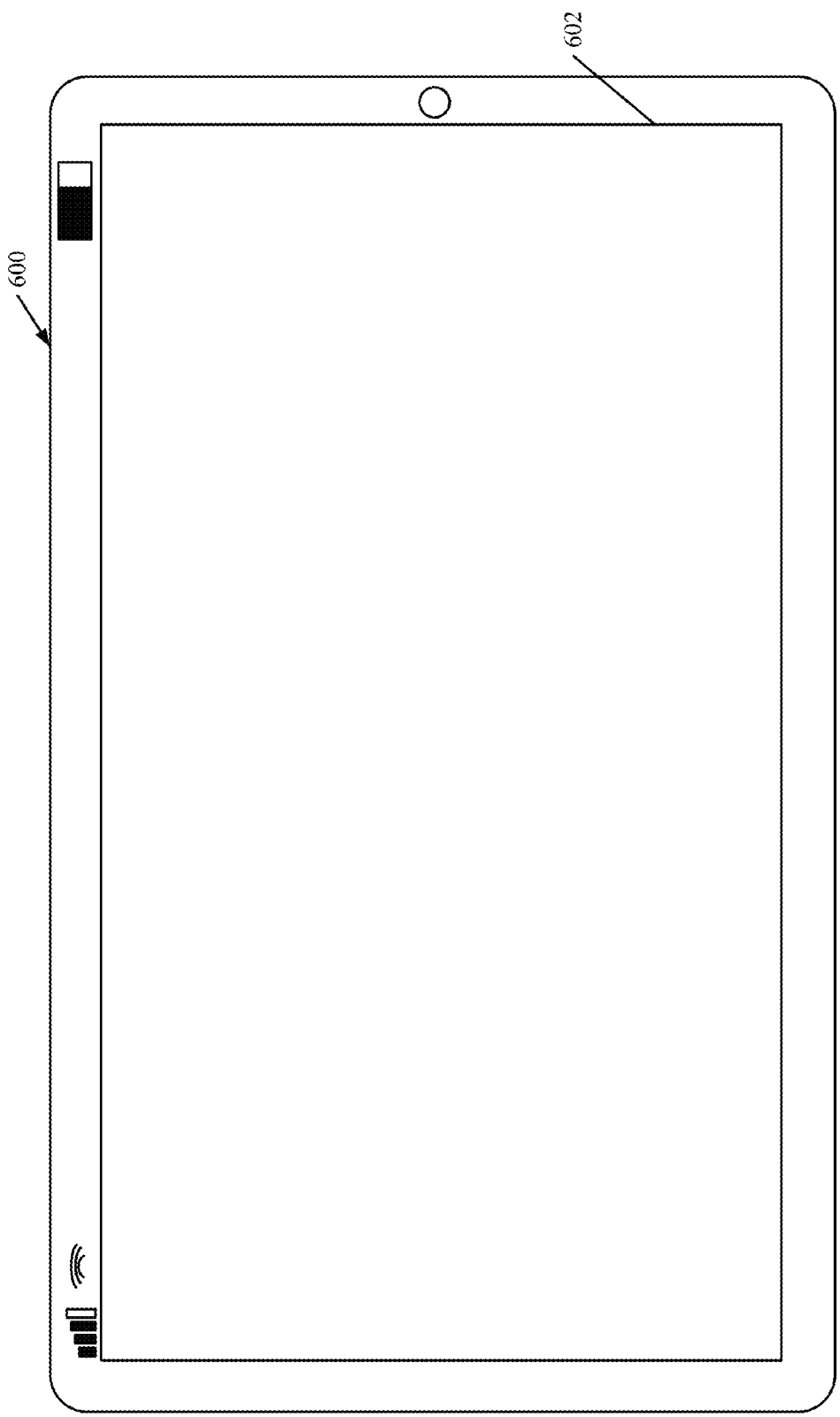
Figure 7:
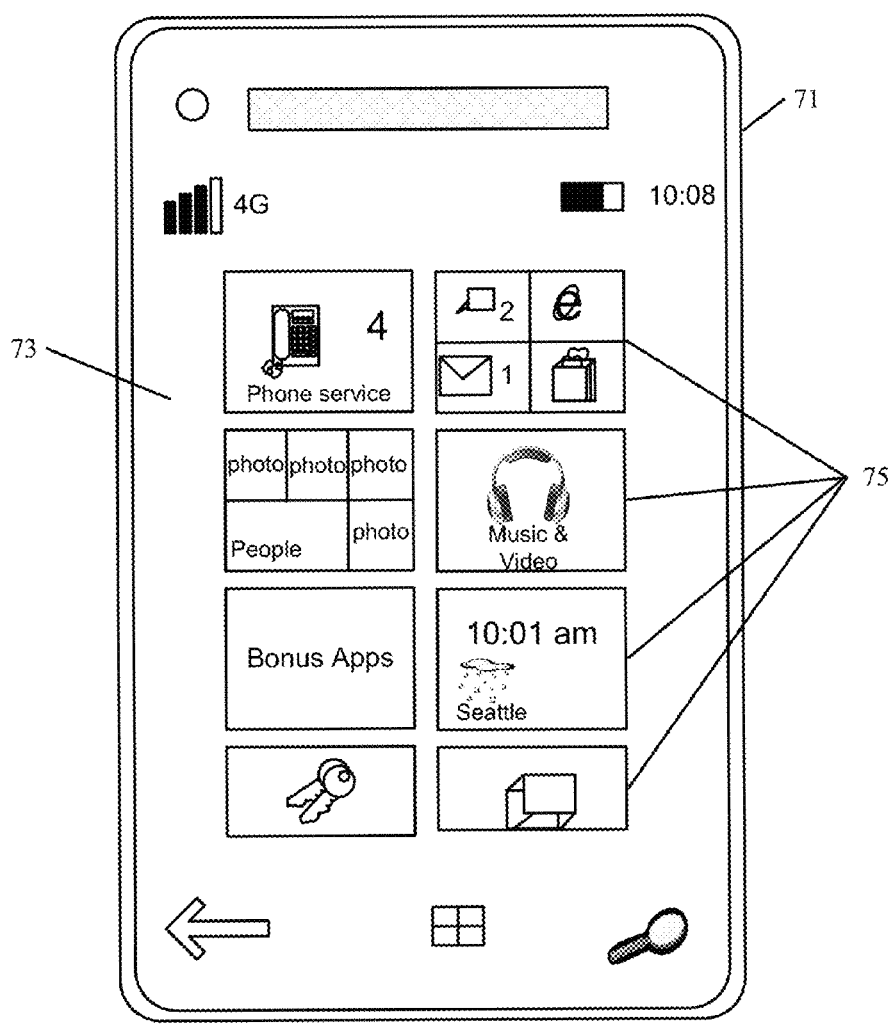

FIG. 5 is a simplified block diagram of one illustrative embodiment of a handheld or mobile computing device that can be used as a user's or client's hand held device 16, in which the present system (or parts of it) can be deployed. For instance, a mobile device can be deployed in the operator compartment 201 of agricultural vehicle 102 for use in generating, processing, or displaying the sensor data control signals, etc. FIGS. 6-7 are examples of handheld or mobile devices.

FIG. 5 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication link 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 6 shows one example in which device 16 is a tablet computer 600. In FIG. 6, computer 600 is shown with user interface display screen 602. Screen 602 can be a touch screen or a pen-enabled interface that receives inputs from a pen or stylus. It can also use an on-screen virtual keyboard 862. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of device 16 are possible.

Figure 8:
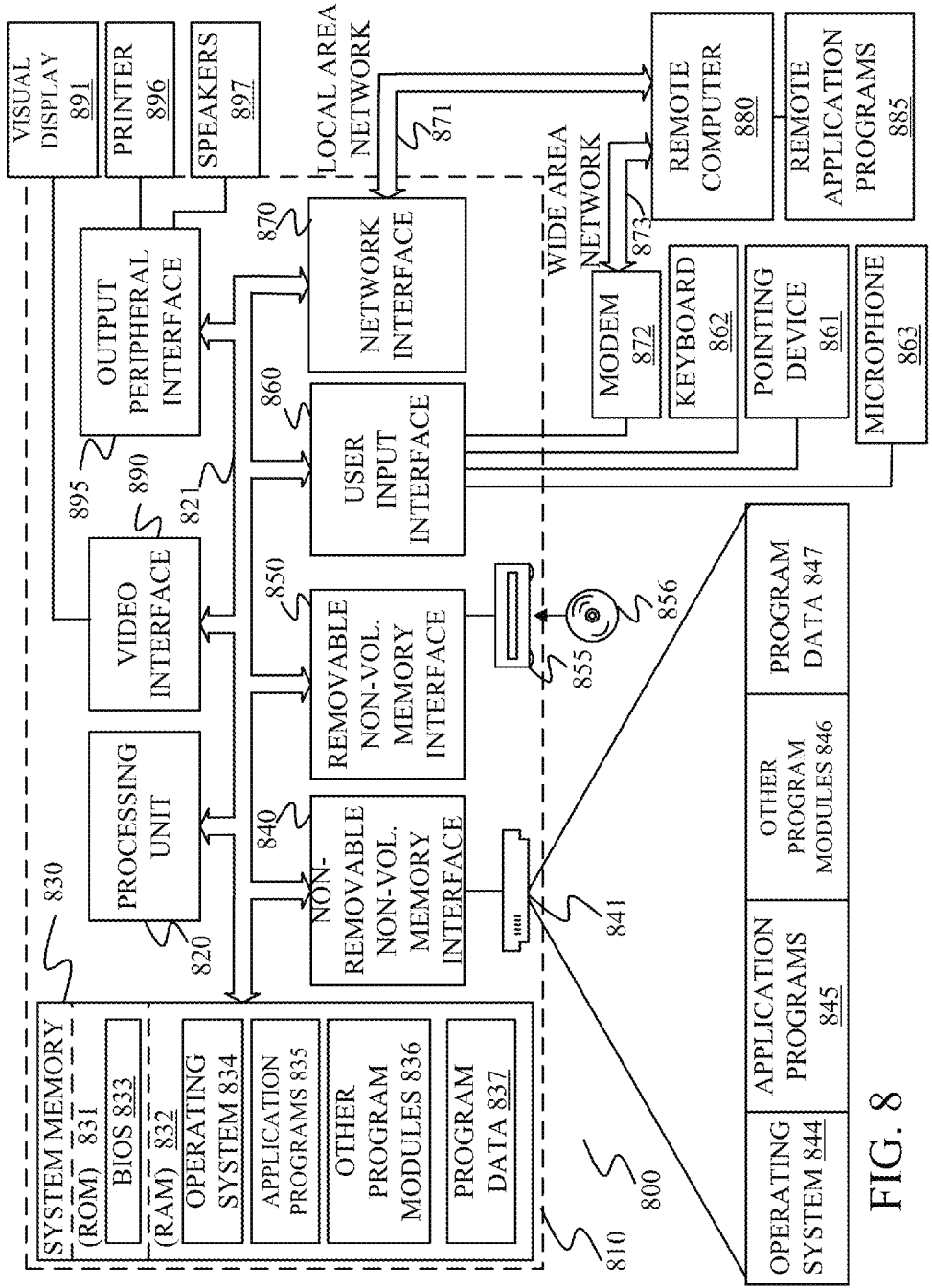
FIG. 8 is a block diagram of one example of a computing environment that can be used in the architectures shown in the previous figures.

FIG. 8 is one example of a computing environment in which elements of FIG. 1, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processors or servers 110), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is an agricultural vehicle control system, comprising:
  a sensor signal value generator that receives a sensor signal indicative of a sensed variable and repeatedly generates a signal value indicative of a value of the sensed variable;
  a first filter that generates a first filter signal value corresponding to the sensed variable, based on a first plurality of signal values generated by the sensor signal value generator over a first time interval;
  a second filter that generates a second filter signal value corresponding to the sensed variable, based on a second plurality of signal values, different from the first plurality of signal values, generated by the sensor signal value generator over a second time interval, different from the first time interval; and
  control system logic that receives the first filter signal value and the second filter signal value and generates a control signal to control a controllable subsystem on the agricultural vehicle based on the first filter signal value and the second filter signal value.

Example 2 is the agricultural vehicle control system of any or all previous examples wherein the control system logic comprises:
  evaluation logic configured to compare the first and second filter signal values and identify an action based on the comparison.

Example 3 is the agricultural vehicle control system of any or all previous examples wherein the control system logic comprises:
  control signal generator logic configured to generate the control signal based on the identified action.

Example 4 is the agricultural vehicle control system of any or all previous examples wherein the evaluation logic is configured to identify a difference between the first and second filter signal values and identify the action based on the difference.

Example 5 is the agricultural vehicle control system of any or all previous examples wherein the evaluation logic is configured to identify the action based on whether the difference between the first and second filter signal values meets a difference threshold.

Example 6 is the agricultural vehicle control system of any or all previous examples wherein the evaluation logic is configured to identify the action based on how the difference between the first and second filter signal values compares to one or more previous differences between the first and second filter signal values.

Example 7 is the agricultural vehicle control system of any or all previous examples and further comprising:
  a sensor configured to sense the sensed variable and generate the sensor signal.

Example 8 is the agricultural vehicle control system of any or all previous examples wherein the agricultural vehicle comprises a combine harvester with a clean grain tank and wherein the sensor comprises:
  a material other than grain sensor configured to sense a constituent portion of material other than grain entering the clean grain tank on the combine harvester, the sensor signal being indicative of the constituent portion of the material other than grain entering the clean grain tank.

Example 9 is the agricultural vehicle control system of any or all previous examples wherein the agricultural vehicle comprises a combine harvester with a separator subsystem and wherein the sensor comprises:
  a grain loss sensor configured to sense an amount of grain lost by the separator subsystem of the combine harvester.

Example 10 is the agricultural vehicle control system of any or all previous examples wherein the agricultural vehicle comprises a combine harvester with a grain cleaning subsystem and wherein the sensor comprises:
  a grain loss sensor configured to sense an amount of grain lost by the grain cleaning subsystem of the combine harvester.

Example 11 is the agricultural vehicle control system of any or all previous examples wherein the agricultural vehicle comprises a combine harvester with a clean grain tank and wherein the sensor comprises:
  a grain quality sensor configured to sense a constituent amount of cracked grain entering the clean grain tank of the combine harvester.

Example 12 is the agricultural vehicle control system of any or all previous examples wherein the agricultural vehicle comprises a combine harvester with a clean grain tank and wherein the sensor comprises:
  a grain quality sensor configured to sense a constituent amount of unthreshed grain entering the clean grain tank of the combine harvester.

Example 13 is a computer-implemented method of controlling an agricultural vehicle, comprising:
  receiving a sensor signal indicative of a sensed variable;
  repeatedly generating a signal value indicative of a value of the sensed variable;
  applying a first filter to generate a first filter signal value corresponding to the sensed variable, based on a first plurality of signal values generated by the sensor signal value generator over a first time interval;
  applying a second filter to generate a second filter signal value corresponding to the sensed variable, based on a second plurality of signal values, different from the first plurality of signal values, generated by the sensor signal value generator over a second time interval, different from the first time interval; and generating a control signal to control a controllable subsystem on the agricultural vehicle based on the first filter signal value and the second filter signal value.

Example 14 is the computer-implemented method of any or all previous examples wherein generating a control signal comprises:

identifying a difference between the first and second filter signal values; and generating the control signal based on the difference.

Example 15 is the computer-implemented method of any or all previous examples wherein the agricultural vehicle comprises a combine harvester with a clean grain tank and further comprising:

sensing a constituent portion of material other than grain entering the clean grain tank on the combine harvester, the sensor signal being indicative of the constituent portion of the material other than grain entering the clean grain tank.

Example 16 is the computer-implemented method of any or all previous examples wherein the agricultural vehicle comprises a combine harvester with a separator subsystem and further comprising:

sensing an amount of grain lost by the separator subsystem of the combine harvester, the sensor signal being indicative of the amount of grain lost.

Example 17 is the computer-implemented method of any or all previous examples wherein the agricultural vehicle comprises a combine harvester with a grain cleaning subsystem and further comprising:

sensing an amount of grain lost by the grain cleaning subsystem of the combine harvester, the sensor signal being indicative of the amount of grain lost.

Example 18 is the computer-implemented method of any or all previous examples wherein the agricultural vehicle comprises a combine harvester with a clean grain tank and further comprising:

sensing a constituent amount of cracked or unthreshed grain entering the clean grain tank of the combine harvester.

Example 19 is an agricultural vehicle, comprising:

a controllable subsystem;

a sensor configured to sense a sensed variable and generate a sensor signal indicative of a value of the sensed variable;

a sensor signal value generator that receives the sensor signal and repeatedly generates a signal value indicative of a value of the sensed variable;

a first filter that generates a first filter signal value corresponding to the sensed variable, based on a first plurality of signal values generated by the sensor signal value generator over a first time interval;

a second filter that generates a second filter signal value corresponding to the sensed variable, based on a second plurality of signal values, different from the first plurality of signal values, generated by the sensor signal value generator over a second time interval, different from the first time interval; and control system logic that receives the first filter signal value and the second filter signal value and generates a control signal to control the controllable subsystem on the agricultural vehicle based on the first filter signal value and the second filter signal value.

Example 20 is the agricultural vehicle of any or all previous examples wherein the control system is configured to generate the control signal based on how a difference between the first and second filter signal values compares to one or more previous differences between the first and second filter signal values.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural vehicle control system, comprising:

a sensor signal value generator that receives a sensor signal indicative of a sensed variable and repeatedly generates a signal value indicative of a value of the sensed variable;

a first filter that generates a first filter signal value corresponding to the sensed variable, based on a first plurality of signal values generated by the sensor signal value generator over a first time interval;

a second filter that generates a second filter signal value corresponding to the sensed variable, based on a second plurality of signal values, different from the first plurality of signal values, generated by the sensor signal value generator over a second time interval, different from the first time interval; and control system logic that receives the first filter signal value and the second filter signal value and generates a control signal to control a controllable subsystem on the agricultural vehicle based on the first filter signal value and the second filter signal value.

2. The agricultural vehicle control system of claim 1 wherein the control system logic comprises:

evaluation logic configured to compare the first and second filter signal values and identify an action based on the comparison.

3. The agricultural vehicle control system of claim 2 wherein the control system logic comprises:

control signal generator logic configured to generate the control signal based on the identified action.

4. The agricultural vehicle control system of claim 2 wherein the evaluation logic is configured to identify a difference between the first and second filter signal values and identify the action based on the difference.

5. The agricultural vehicle control system of claim 4 wherein the evaluation logic is configured to identify the action based on whether the difference between the first and second filter signal values meets a difference threshold.

6. The agricultural vehicle control system of claim 4 wherein the evaluation logic is configured to identify the action based on how the difference between the first and second filter signal values compares to one or more previous differences between the first and second filter signal values.

7. The agricultural vehicle control system of claim 1 and further comprising:

a sensor configured to sense the sensed variable and generate the sensor signal.

8. The agricultural vehicle control system of claim 7 wherein the agricultural vehicle comprises a combine harvester with a clean grain tank and wherein the sensor comprises:

a material other than grain sensor configured to sense a constituent portion of material other than grain entering the clean grain tank on the combine harvester, the sensor signal being indicative of the constituent portion of the material other than grain entering the clean grain tank.

9. The agricultural vehicle control system of claim 7 wherein the agricultural vehicle comprises a combine harvester with a separator subsystem and wherein the sensor comprises:
  a grain loss sensor configured to sense an amount of grain lost by the separator subsystem of the combine harvester.

10. The agricultural vehicle control system of claim 7 wherein the agricultural vehicle comprises a combine harvester with a grain cleaning subsystem and wherein the sensor comprises:
  a grain loss sensor configured to sense an amount of grain lost by the grain cleaning subsystem of the combine harvester.

11. The agricultural vehicle control system of claim 7 wherein the agricultural vehicle comprises a combine harvester with a clean grain tank and wherein the sensor comprises:
  a grain quality sensor configured to sense a constituent amount of cracked grain entering the clean grain tank of the combine harvester.

12. The agricultural vehicle control system of claim 7 wherein the agricultural vehicle comprises a combine harvester with a clean grain tank and wherein the sensor comprises:
  a grain quality sensor configured to sense a constituent amount of unthreshed grain entering the clean grain tank of the combine harvester.

13. A computer-implemented method of controlling an agricultural vehicle, comprising:
  receiving a sensor signal indicative of a sensed variable;
  repeatedly generating a signal value indicative of a value of the sensed variable;
  applying a first filter to generate a first filter signal value corresponding to the sensed variable, based on a first plurality of signal values generated by the sensor signal value generator over a first time interval;
  applying a second filter to generate a second filter signal value corresponding to the sensed variable, based on a second plurality of signal values, different from the first plurality of signal values, generated by the sensor signal value generator over a second time interval, different from the first time interval; and
  generating a control signal to control a controllable subsystem on the agricultural vehicle based on the first filter signal value and the second filter signal value.

14. The computer-implemented method of claim 13 wherein generating a control signal comprises:
  identifying a difference between the first and second filter signal values; and
  generating the control signal based on the difference.

15. The computer-implemented method of claim 13 wherein the agricultural vehicle comprises a combine harvester with a clean grain tank and further comprising:
  sensing a constituent portion of material other than grain entering the clean grain tank on the combine harvester, the sensor signal being indicative of the constituent portion of the material other than grain entering the clean grain tank.

16. The computer-implemented method of claim 13 wherein the agricultural vehicle comprises a combine harvester with a separator subsystem and further comprising:
  sensing an amount of grain lost by the separator subsystem of the combine harvester, the sensor signal being indicative of the amount of grain lost.

17. The computer-implemented method of claim 13 wherein the agricultural vehicle comprises a combine harvester with a grain cleaning subsystem and further comprising:
  sensing an amount of grain lost by the grain cleaning subsystem of the combine harvester, the sensor signal being indicative of the amount of grain lost.

18. The computer-implemented method of claim 13 wherein the agricultural vehicle comprises a combine harvester with a clean grain tank and further comprising:
  sensing a constituent amount of cracked or unthreshed grain entering the clean grain tank of the combine harvester.

19. An agricultural vehicle, comprising:
  a controllable subsystem;
  a sensor configured to sense a sensed variable and generate a sensor signal indicative of a value of the sensed variable;
  a sensor signal value generator that receives the sensor signal and repeatedly generates a signal value indicative of a value of the sensed variable;
  a first filter that generates a first filter signal value corresponding to the sensed variable, based on a first plurality of signal values generated by the sensor signal value generator over a first time interval;
  a second filter that generates a second filter signal value corresponding to the sensed variable, based on a second plurality of signal values, different from the first plurality of signal values, generated by the sensor signal value generator over a second time interval, different from the first time interval; and
  control system logic that receives the first filter signal value and the second filter signal value and generates a control signal to control the controllable subsystem on the agricultural vehicle based on the first filter signal value and the second filter signal value.

20. The agricultural vehicle of claim 19 wherein the control system is configured to generate the control signal based on how a difference between the first and second filter signal values compares to one or more previous differences between the first and second filter signal values.

\* \* \* \* \*